(12) United States Patent
Kuo et al.

(10) Patent No.: US 11,113,483 B2
(45) Date of Patent: Sep. 7, 2021

(54) RADIO FREQUENCY IDENTIFICATION (RFID) SYSTEM

(71) Applicant: CYMMETRIK ENTERPRISE CO., LTD., Taipei (TW)

(72) Inventors: Shan-Jen Kuo, Taipei (TW); Frank Shang-Teng Chan, Taipei (TW); Yosephine Yulia Margaretha, Taipei (TW); Jen-Chieh Wei, Taipei (TW); Shao-Ming Kao, Taipei (TW)

(73) Assignee: CYMMETRIK ENTERPRISE CO., LTD., Taipei (TW)

( * ) Notice: Subject to any disclaimer, the term of this patent is extended or adjusted under 35 U.S.C. 154(b) by 8 days.

(21) Appl. No.: 16/716,059

(22) Filed: Dec. 16, 2019

(65) Prior Publication Data

US 2021/0182509 A1 Jun. 17, 2021

(51) Int. Cl.
| | |
|---|---|
| *G06K 7/10* | (2006.01) |
| *G06K 19/077* | (2006.01) |
| *H04B 1/38* | (2015.01) |
| *H01Q 7/00* | (2006.01) |

(52) U.S. Cl.
CPC ... *G06K 7/10316* (2013.01); *G06K 19/07773* (2013.01); *H01Q 7/00* (2013.01); *H04B 1/38* (2013.01)

(58) Field of Classification Search
CPC ............. G06K 7/00; G06K 7/08; G06K 7/081
USPC .................. 235/451, 439, 435, 375
See application file for complete search history.

(56) References Cited

U.S. PATENT DOCUMENTS

| | | | | |
|---|---|---|---|---|
| 2008/0047760 A1* | 2/2008 | Georgitsis | .............. | G01G 19/40 177/1 |
| 2008/0103939 A1* | 5/2008 | Gibb | .................... | G06Q 10/087 705/28 |
| 2012/0105205 A1* | 5/2012 | Claessen | .............. | G07G 1/0018 340/10.1 |
| 2016/0283898 A1* | 9/2016 | Reuther | ............... | G06Q 10/087 |
| 2020/0226577 A1* | 7/2020 | Suzuki | ............... | G01G 19/4144 |

* cited by examiner

*Primary Examiner* — Edwyn Labaze
(74) *Attorney, Agent, or Firm* — Maschoff Brennan

(57) ABSTRACT

A radio frequency identification system comprising: a measuring assembly configured to measure a physical quantity of an object to output a first data associated with the object, a loop antenna configured to be attached to the object, wherein the loop antenna has an IC chip storing a second data associated with the object, a radiation pattern disposed at the measuring assembly and a transreceiver in signal-transmittable connection to the measuring assembly, with the transreceiver configured to perform at least one of sending the first data and receiving the second data when the loop antenna and the radiation pattern are electromagnetically coupled to each other, wherein the IC chip stores the first data when the transreceiver sends the first data, and the measuring assembly receives the second data and outputs a message having the first data and the second data when the transreceiver receives the second data.

14 Claims, 7 Drawing Sheets

RADIO FREQUENCY IDENTIFICATION (RFID) SYSTEM

BACKGROUND

1. Technical Field

This disclosure relates to a radio frequency identification (RFID) system, more particularly to a RFID system that outputs a measured data and another data stored in an IC chip together.

2. Related Art

With the development of radio frequency identification (RFID), this technology has been used in various kinds of applications such as in ID badge, access card or in logistics management. Furthermore, the RFID technology is also used in various kinds of measuring assemblies. For example, a RFID tag may be attached to an object that is disposed on a weighing device, so that when the RFID tag is read, a user may learn about the information and the weight of the object at the same time. Also, a data associated with the object may also be written and stored into the RFID tag by using the RFID reader.

However, in the above description of the prior art, the RFID tag usually has a radiation pattern and a loop antenna that are integrally formed. Meaning that, other RFID tags that are close enough to the RFID reader may be mistakenly read/written. Also, when a relationship between a data and another data stored in the RFID tag is to be built, it usually requires manual operation, and human error will affect the accuracy of which. In addition, if the size of the object is smaller than the RFID tag, the oversized RFID tag may not be attached to the object properly while largely increase the total size of the object and the RFID tag.

SUMMARY

According to one or more embodiment of this disclosure, a radio frequency identification (RFID) system comprising: a measuring assembly configured to measure a physical quantity of an object to output a first data associated with the object; a loop antenna configured to be attached to the object, wherein the loop antenna has an IC chip storing a second data associated with the object; a radiation pattern disposed at the measuring assembly; and a transreceiver in signal-transmittable connection to the measuring assembly, with the transreceiver configured to perform at least one of sending the first data and receiving the second data when the loop antenna and the radiation pattern are electromagnetically coupled to each other, wherein the IC chip stores the first data when the transreceiver sends the first data, and the measuring assembly receives the second data and outputs a message having the first data and the second data when the transreceiver receives the second data.

BRIEF DESCRIPTION OF THE DRAWINGS

The present disclosure will become more fully understood from the detailed description given hereinbelow and the accompanying drawings which are given by way of illustration only and thus are not limited to the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
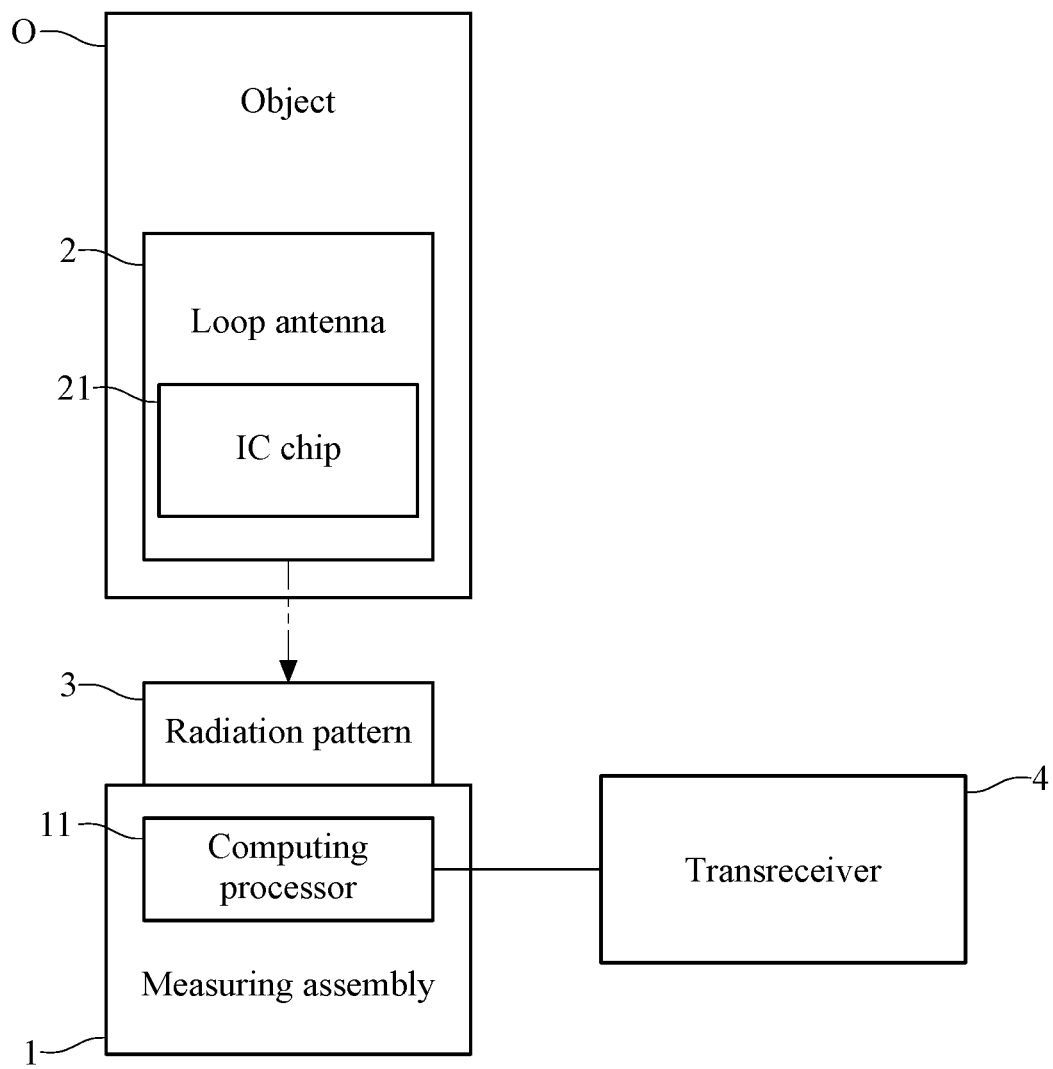
FIG. 1 is a block diagram of an embodiment of a radio frequency identification system according to the present disclosure.

Please refer to FIG. 1. FIG. 1 is a block diagram of an embodiment of a radio frequency identification (RFID) system according to the present disclosure. The RFID system includes a measuring assembly 1, a loop antenna 2, a radiation pattern 3 and a transreceiver 4.

The measuring assembly 1 is configured to measure a physical quantity of an object O to obtain a first data associated with the object O. To be more specific, the first data can be the weight, length, volume, temperature, body fat percentage, timing of the measurement and/or material of the object O, and can also be the amount of a plurality of sub-objects of the object O; however, the present disclosure is not limited thereto. The measuring assembly 1 preferably has a measuring apparatus, and the measuring apparatus preferably has a supporting surface configured to support the object O. The measuring device 1 preferably further has a computing processor 11, and the computing processor 11 can be arranged along with the measuring apparatus as a whole, or be arranged separately from the measuring apparatus, such as a remote server. To be more specific, the transreceiver 4 can be electrically connected to the computing processor 11 of the measuring assembly 1 in a wired or wireless way.

The loop antenna 2 is attached to the object O, wherein the loop antenna 2 has an IC chip 21 that stores a second data associated with the object O. To be more specific, the second data can be an ID number, an address, a number, a serial number, a name and/or a type of the object O, and the present disclosure is not limited thereto. Specifically, when the first data is the amount of the sub-objects, the loop antenna 2 can be attached to a container supporting the sub-objects while the container and the sub-objects forms the object O together.

The radiation pattern 3 is disposed at the measuring assembly 1, and preferably on the supporting surface of the measuring assembly 1. However, the radiation pattern 3 can also be disposed right under the supporting surface.

The transreceiver 4 is in signal-transmittable connection to the computing processor 11 of the measuring assembly 1. To be more specific, the transreceiver 4 includes a reader 41 and a reader antenna 42 to read/write data from/into the IC chip 21, while the reader antenna 42 is preferably arranged in a position out of the transmission range of the loop antenna 2 but within that of the combination of the loop antenna 2 and radiation pattern 3. After the transreceiver 4 reads the second data that is stored in the IC chip 21, the computing processor 11 of the measuring assembly 1 sends the message that includes the first data and the second data to an external device. The external device can be a computer, an internet server or a cloud, the present disclosure is not limited thereto. Alternatively, the transreceiver 4 can be configured to write the first data received from the measuring assembly 1 into the IC chip 21. That is, the transreceiver 4 transmits the first/second data from/to the IC chip 21 when the loop antenna 2 and the radiation pattern 3 are electromagnetically coupled to each other.

Specifically, the radiation pattern 3 has a coupling range and the transreceiver 4 has a transmitting range, and the transreceiver 4 transmits the first/second data when the loop antenna 2 is within the coupling range and the coupling range overlaps the transmitting range. In one or more embodiments of the RFID system according to the present disclosure, a radius of the coupling range is preferably within 30 cm, so that loop antennas attached on other objects that are yet to be measured are not coupled to the radiation pattern 3. However, the coupling range is not limited thereto.

In one or more embodiments of the RFID system of the present disclosure, the measuring assembly 1 has a computing processor 11. The transreceiver 4 reads the second data stored in the IC chip 21 and sends the second data to the computing processor 11 of the measuring assembly 1. The computing processor 11 may then output a message having the first data and the second data while, preferably, the computing processor 11 serially combines the first data and the second data to generate the message.

On the other hand, in one or more embodiments of the RFID system of the present disclosure, the transreceiver 4 receives the first data from the measuring assembly 1 and writes the first data into the IC chip 21. Accordingly, the first data and the second data are combined in the IC chip 21 and can be accessed together.

To be more specific, the transreceiver 4 can perform not only sending the first data received from the computing device 11 to the IC chip 21 of the loop antenna 2 but also receiving the second data from the IC chip 21 of the loop antenna 2.

Figure 2A:
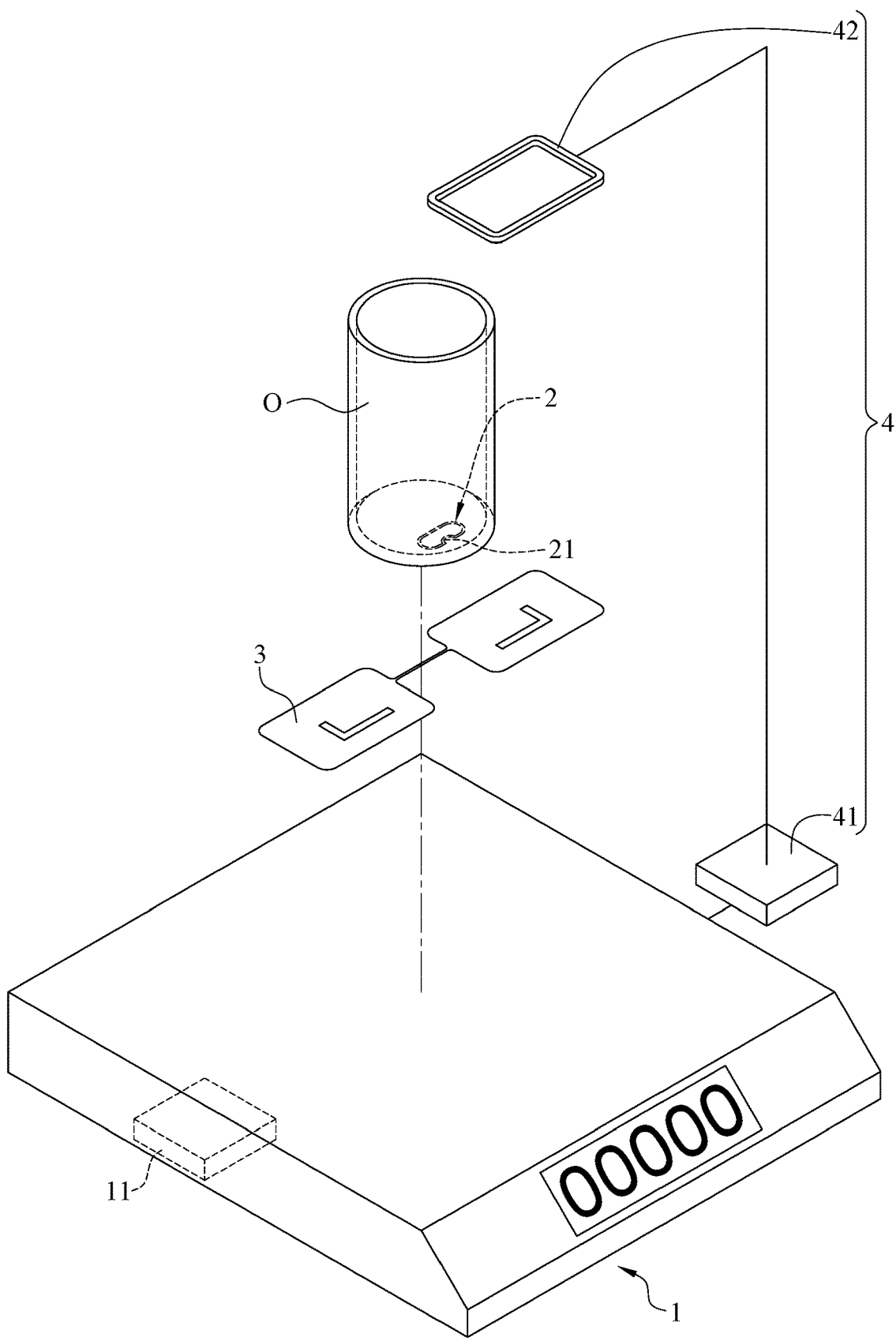
FIG. 2A is an exploded view of a first embodiment of a radio frequency identification system according to the present disclosure.
Figure 2B:
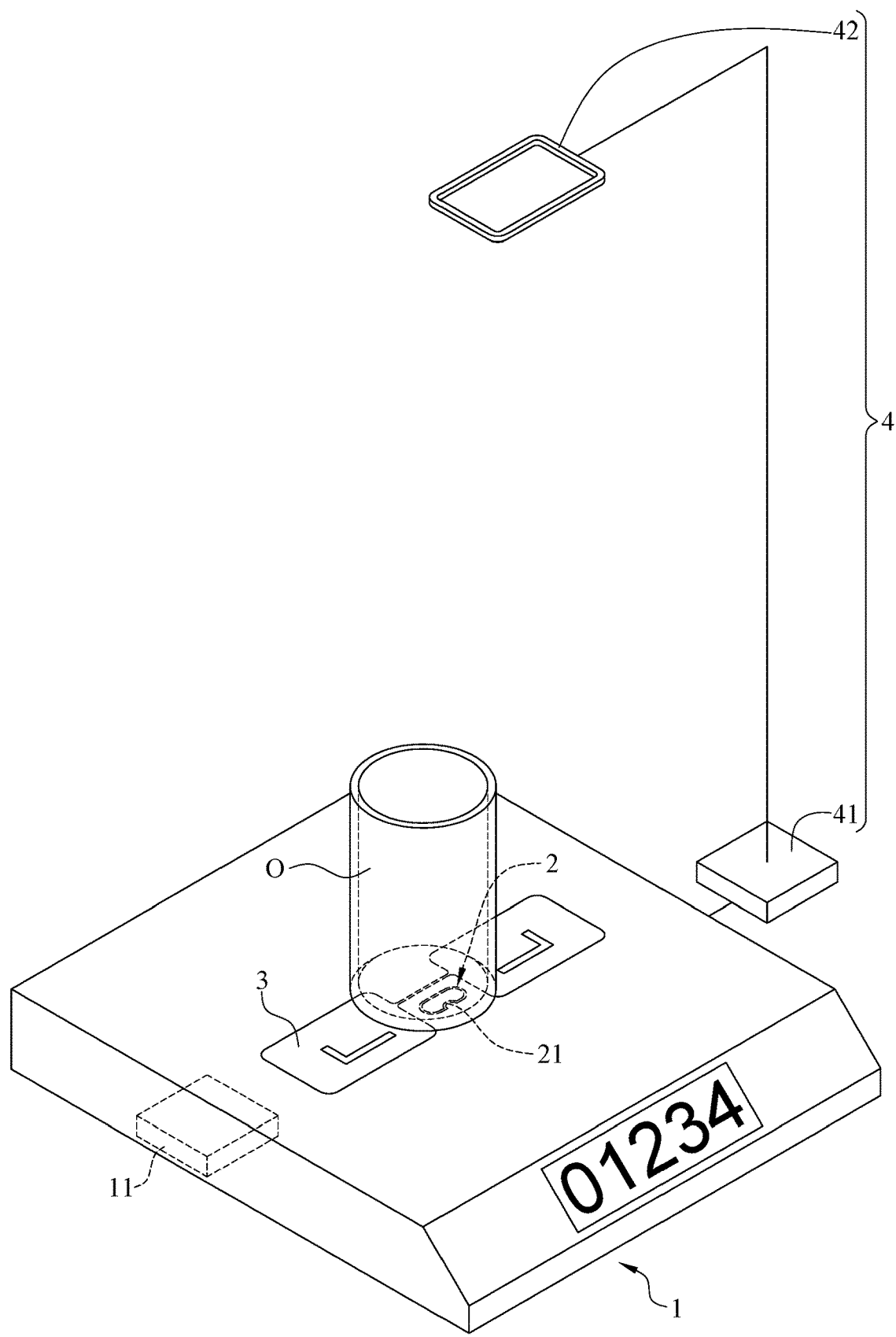
FIG. 2B is an exemplary illustration of the first embodiment of a radio frequency identification system according to the present disclosure.

Please refer to FIGS. 2A and 2B, wherein FIG. 2A is an exploded view of a first embodiment of a radio frequency identification system according to the present disclosure; and FIG. 2B is an exemplary illustration of the first embodiment of a radio frequency identification system according to the present disclosure.

In the first embodiment, the measuring assembly 1 has a weighing apparatus configured to measure the object O to obtain the first data, wherein the first data is preferably the weight of the object O. The loop antenna 2 and its IC chip 21 are attached at the surface of the object O, preferably the bottom surface of the object O. The radiation pattern 3 is disposed on the surface of the measuring assembly 1.

After the measuring assembly 1 obtains the first data, the transreceiver 4 then transmits the first or the second data when the loop antenna 2 and the radiation pattern 3 are electromagnetically coupled to each other, wherein said second data may be the serial number of the object O or the name of what is contained inside.

Specifically, the transreceiver 4 reads the second data and sends the second data to the computing processor 11 of the measuring assembly 1, wherein the computing processor 11 is in signal-transmittable connection with the measuring assembly 1 and the transreceiver 4. The computing processor 11 can then accordingly combine the first data and the second data to generate the message, and outputs the message to the external device.

On the other hand, when the first data is sent from the computing processor 11 of the measuring assembly 1, the transreceiver 4 can also write the first data received from the computing processor 11 into the IC chip 21. Therefore, when the IC chip 21 is accessed thereafter, the first data can be accessed along with the second data.

Figure 3:
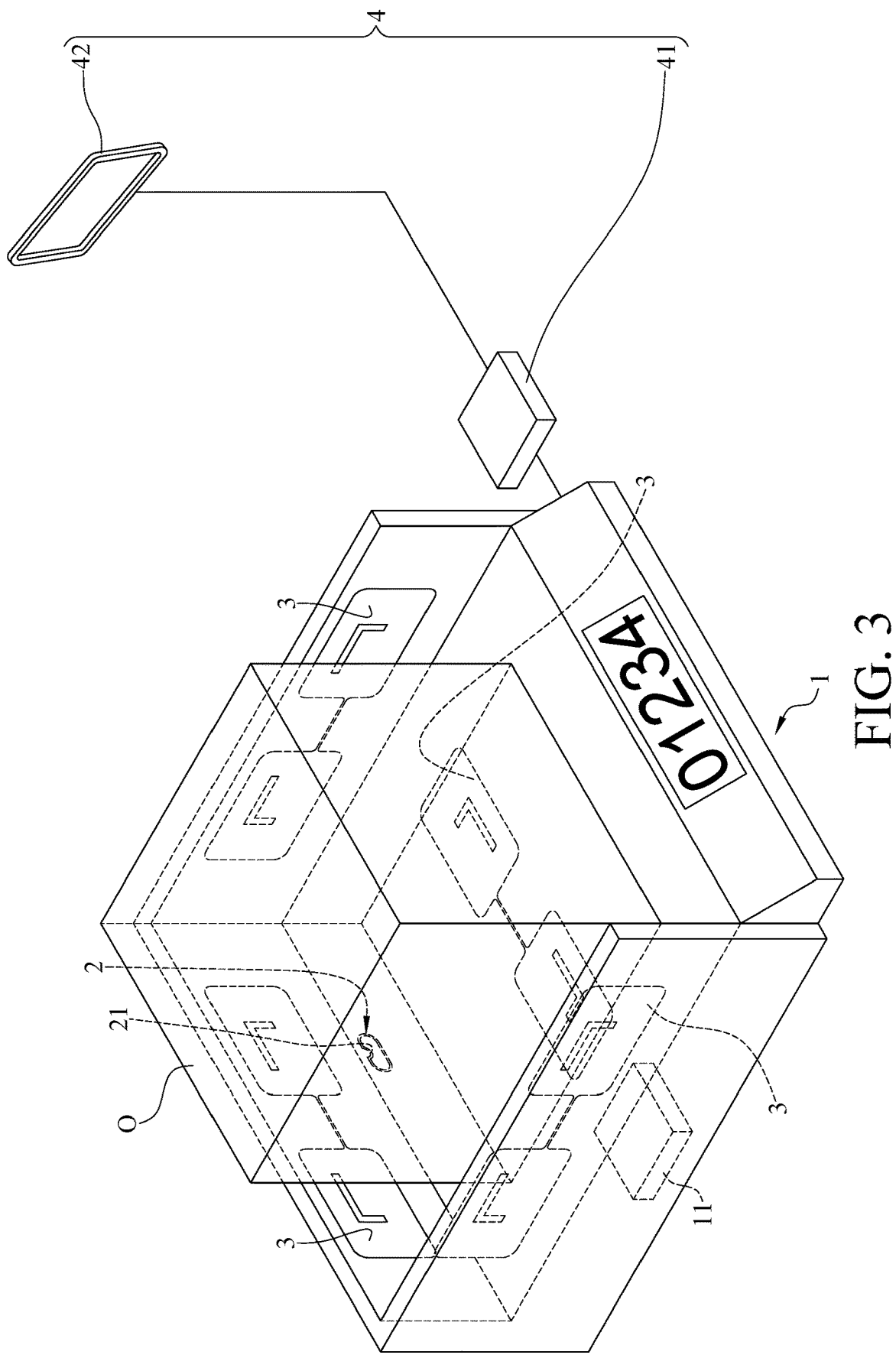
FIG. 3 is an exemplary illustration of a second embodiment of a radio frequency identification system according to the present disclosure.

Please refer to FIG. 3. FIG. 3 is an exemplary illustration of a second embodiment of a radio frequency identification system according to the present disclosure.

The second embodiment illustrated in FIG. 3 is similar to the first embodiment illustrated in FIGS. 2A and 2B. Comparing to FIGS. 2A and 2B, the second embodiment illustrated in FIG. 3 further comprises more than one radiation pattern 3. That is, the radiation patterns 3 can be attached to different surfaces/side walls of the measuring assembly 1. Accordingly, when the loop antenna 2 is attached on other surfaces of the object O instead of the bottom surface, the loop antenna 2 and the radiation pattern 3 are electromagnetically connected to each other.

Figure 4:
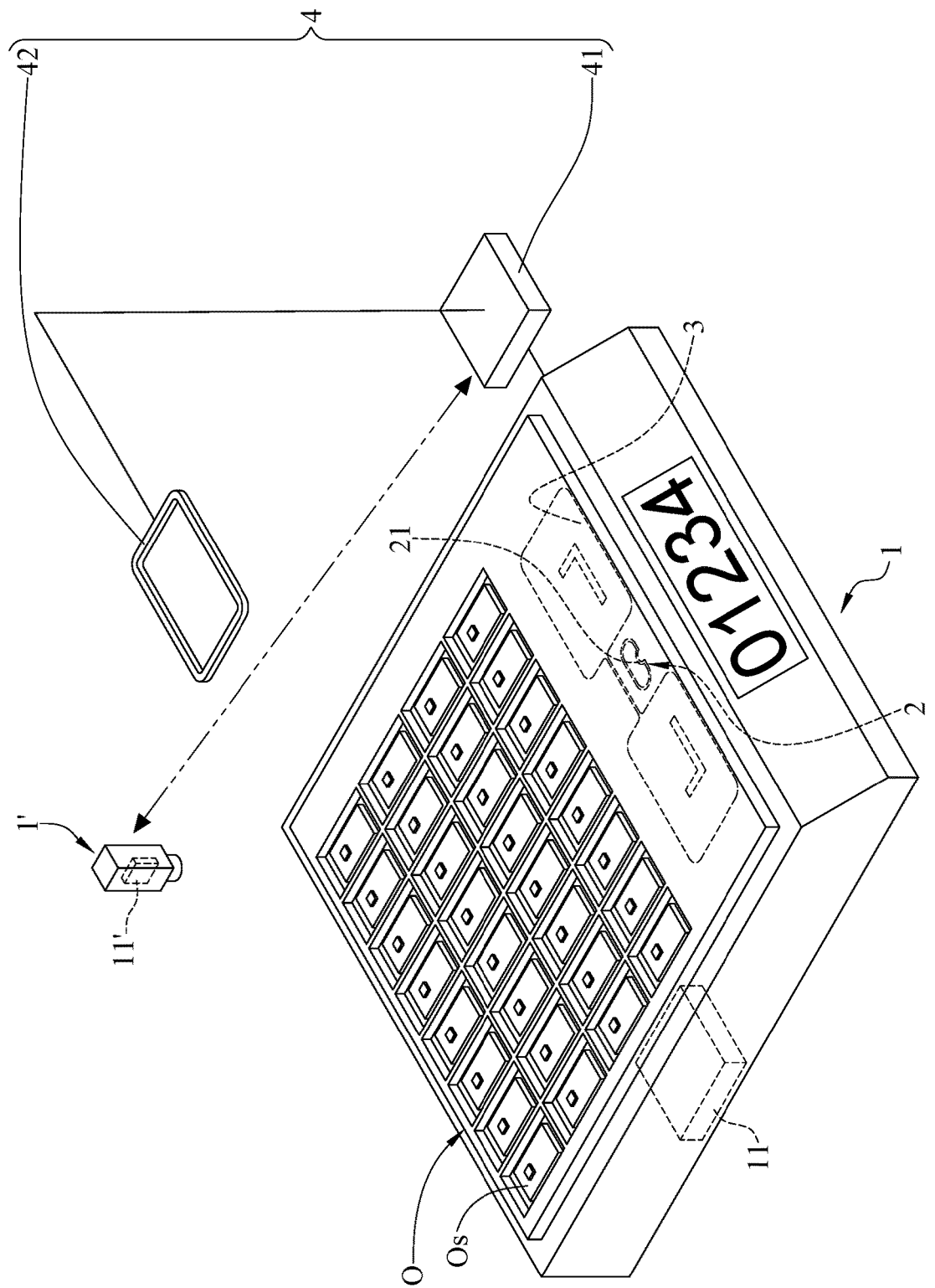
FIG. 4 is an exemplary illustration of a third embodiment of a radio frequency identification system according to the present disclosure.

Please refer to FIG. 4. FIG. 4 is an exemplary illustration of a third embodiment of a radio frequency identification system according to the present disclosure. The third embodiment is preferably realized in the manufacturing process of electronic components. However, the present disclosure is not limited thereto.

To be more specific, the object O in the third embodiment includes a plurality of electronic components disposed on a tray, which are serving as the previously described sub-objects Os and container. The loop antenna 2 is attached to the bottom of the tray and the radiation pattern 3 is attached at the supporting surface of the measuring assembly 1. Wherein, the locations of the loop antenna 2 and the radiation pattern 3 in FIG. 4 are exemplarily illustrated. That is, the loop antenna 2 can also be disposed on the top surface or other locations of the tray, and the radiation pattern 3 can be disposed at other location of the measuring assembly 1, as long as the distance between the loop antenna 2 and the radiation pattern 3 is within the coupling range.

According to the RFID system in the third embodiment, the measuring assembly 1 can be used to obtain the amount of the sub-objects Os, for example, the amount of the electronic components disposed in the tray in this embodiment.

For example, the measuring assembly 1 first obtains the first data (measured weight) of the object O and the transreceiver 4 reads the second data stored in the IC chip 21, wherein the second data preferably includes a predetermined weight of one electronic component (the weight of one sub-object Os). The computing processor 11 then receives both the first data (measured weight of object O) and the second data (predetermined weight of one sub-object Os), and calculates the amount of electronic components (the amount of sub-objects Os) based on the first data and the second data. The transreceiver 4 can then receive the calculated amount of sub-objects Os and write the calculated amount to the IC chip 21, and the transreceiver 4 can also send the calculated amount to the external device.

The measuring assembly 1' can also be realized as a camera. Specifically, the measuring assembly 1' (camera) may obtain an image of the object O, which shows all of the sub-objects Os (electronic components), and the computing processor 11' of the measuring assembly 1' can then obtain the amount of the sub-objects Os via pattern recognition.

Figure 5:
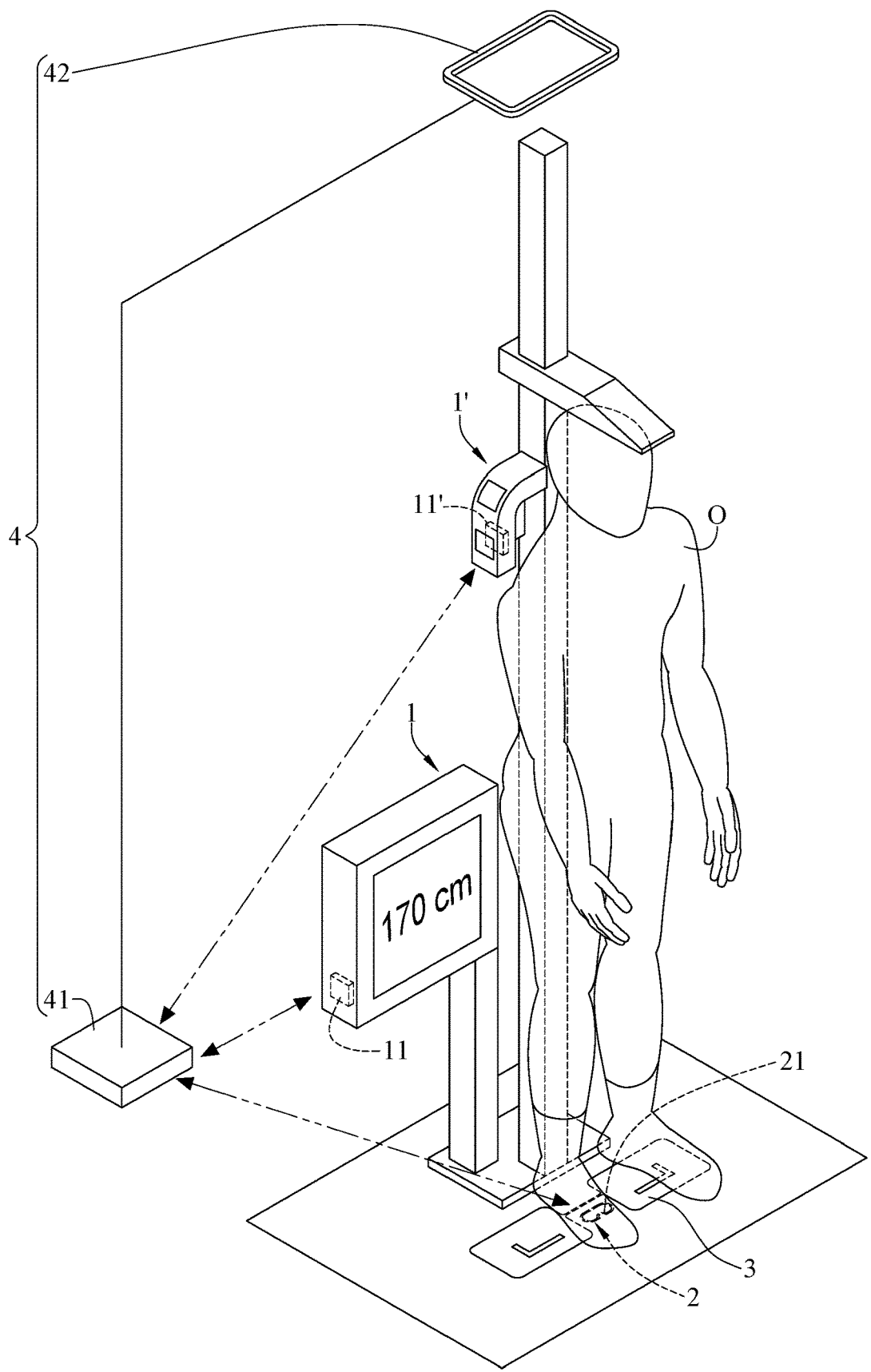
FIG. 5 is an exemplary illustration of a fourth embodiment of a radio frequency identification system according to the present disclosure.

Please refer to FIG. 5. FIG. 5 is an exemplary illustration of a fourth embodiment of a radio frequency identification system according to the present disclosure. The measuring assembly 1 can be realized as having a stadiometer as the measuring apparatus. The measuring assembly 1 is configured to measure a height (first data) of a subject (object O).

Specifically, the loop antenna 2 is attached at a sole of the object O, and the radiation pattern 3 is disposed at a floor or a platform of the measuring assembly 1, which is for the object O to stand on. The measuring assembly 1 measures the height of the object O to obtain the first data, wherein the second data can be an identification information stored in the IC chip 21 associated with the object O.

After the measuring assembly 1 obtains the first data (height), the computing processor 11 can send the first data to the transreceiver 4, so that the transreceiver 4 can write the first data into the IC chip 21. On the other hand, the computing processor 11 can combine the first data and the second data read from the IC chip 21 by the transreceiver 4, and the computing processor 11 then generates the message having the first data and the second data to output the message to the external device.

On the other hand, a variant of the measuring assembly 1, a measuring assembly 1' having a thermometer, is shown to obtain the temperature of the object O, wherein the measuring assembly 1' includes a computing processor 11' to generate the message having the first data (temperature) and the second data (identification information associated with the object O). The operation of the embodiment with the measuring assembly 1' having the thermometer is similar to the embodiment of the stadiometer described above. Therefore, the embodiment of the thermometer will not be further described herein.

Figure 6:
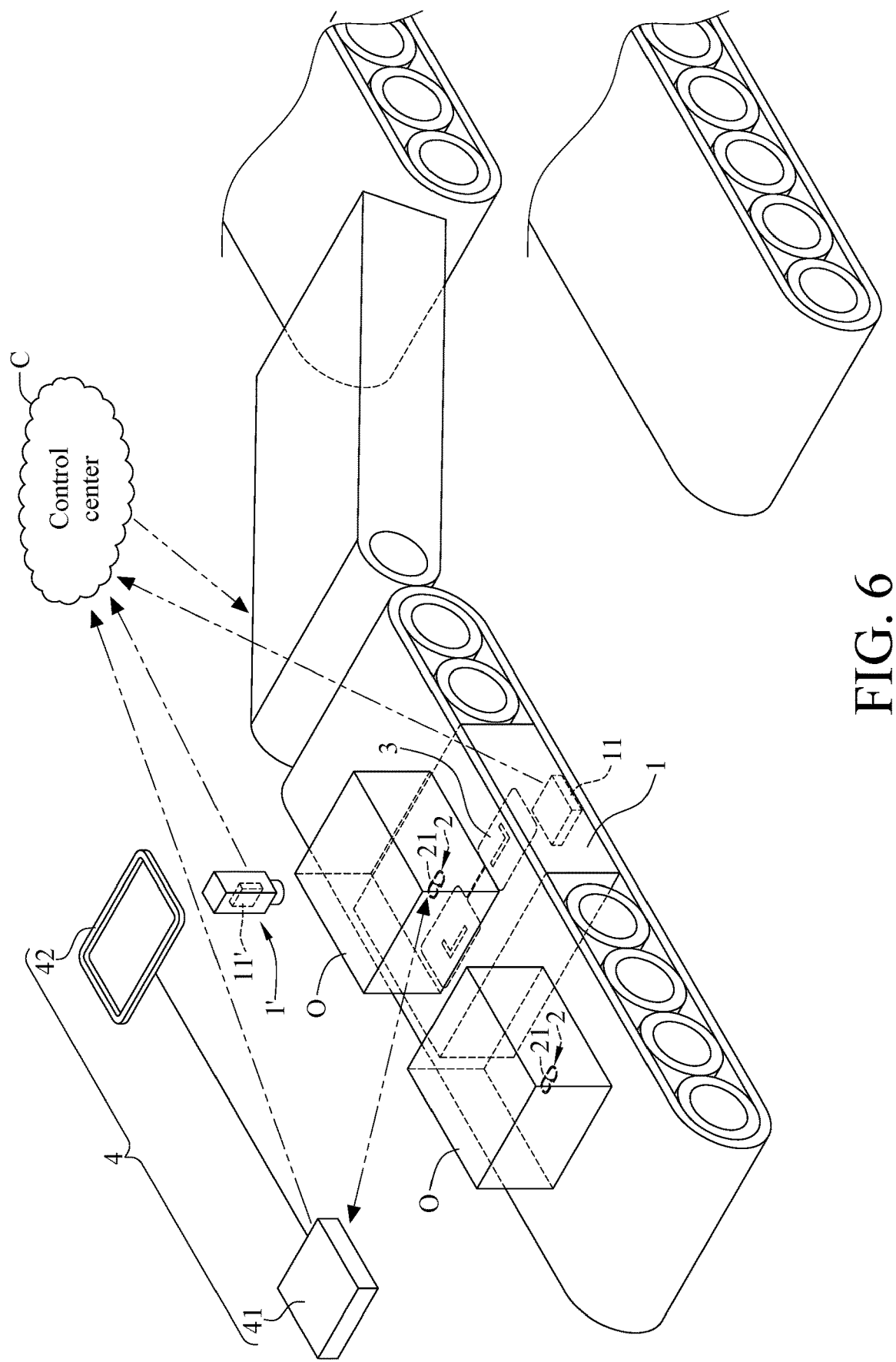
FIG. 6 is an exemplary illustration of a fifth embodiment of a radio frequency identification system according to the present disclosure.

Please refer to FIG. 6. FIG. 6 is an exemplary illustration of a fifth embodiment of a radio frequency identification system according to the present disclosure. The fifth embodiment of the present disclosure can be realized in a logistics system, preferably in logistics system using conveyor to delivery cargos.

To be more specific, the measuring assembly 1 can have a weighing apparatus stationed in a space between of a circular conveyor belt, and the loop antenna 2 is disposed at the bottom surface of the object O while the radiation pattern 3 is disposed on a top surface of the measuring assembly 1. The measuring assembly 1 obtains a weight (first data) of the object O when it is above the measuring assembly 1 and at the same time the loop antenna 2 is coupled to the radiation pattern 3. The second data stored in the IC chip 21 is preferably a serial number or other identity information associated with the object O.

The transreceiver 4 then reads the second data from the IC chip 21 to a control center C of the logistics system. At the same time, the computing processor 11 sends the first data to the control center C.

The control center C of the logistics system can categorize the object O and assign which conveyor belt or direction that the object O should be delivered based on the first data received from the computing processor 11 and the second data received from the transreceiver 4. In addition, a variant of the measuring assembly 1, a measuring assembly 1' having a depth camera, is shown to obtain the 3D information of the object O so as to calculate the volume thereof. Accordingly, the first data sent by the computing processor 11' of the measuring assembly 1' can include the volume of the object O.

On the other hand, the transreceiver 4 can also write the weight and/or the volume received from the computing processor 11/11' into the IC chip 21 for later reference. The computing processor 11/11' can also generate the message having the first data and second data by combining the first data and second data and sends the message to the control center C. The present disclosure is not limited thereto.

In addition, when the object O is not stored in a container and the measuring assembly 1' includes a spectrometer, the measuring assembly 1' can obtain a spectrum of the object O. Specifically, the measuring assembly 1' emits an X-Ray to the object O to receive a reflected light reflected from the object O in order to obtain a spectrum associated with the object O. Accordingly, the computing processor 11' determines a material type or a composition of the object O based on the spectrum. Then, the control center C of the logistics system can also categorize or label the object O using the obtained spectrum.

In view of the above description, the above embodiments of the present disclosure may realize a RFID system that may combine the first data and the second data to obtain and transmit the message to the external device. Accordingly, the RFID system according to one or more embodiments of the present disclosure may prevent human errors that may occur if the first data and the second data are combined manually. The RFID system according to one or more embodiments of the present disclosure may prevent undesired data that is stored in other RFID tags being written into the IC chip that is being accessed, as well as prevent the desired data being stored into other RFID tags. In addition, the RFID system according to one or more embodiments of the present disclosure may be utilized on objects that the traditional RFID tags can't be properly attached on.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. A radio frequency identification (RFID) system comprising:
   a measuring assembly configured to measure a physical quantity of an object to output a first data associated with the object;
   a loop antenna configured to be attached to the object, wherein the loop antenna has an IC chip storing a second data associated with the object;
   a radiation pattern disposed at the measuring assembly; and
   a transreceiver in signal-transmittable connection to the measuring assembly, with the transreceiver configured to perform at least one of sending the first data and receiving the second data when the loop antenna and the radiation pattern are electromagnetically coupled to each other,
   wherein the IC chip stores the first data when the transreceiver sends the first data, and the measuring assembly receives the second data and outputs a message having the first data and the second data when the transreceiver receives the second data.

2. The RFID system of claim 1, wherein the measuring assembly has a computing processor, the transreceiver reads the second data and sends the second data to the computing processor, and the computing processor generates the message.

3. The RFID system of claim 2, wherein the computing processor of the measuring assembly generates the message by serially combining the first data with the second data.

4. The RFID system of claim 2, wherein the measuring assembly includes a weighing apparatus configured to obtain a weight of the object.

5. The RFID system of claim 4, wherein the object is a plurality of sub-objects, the computing processor obtains an amount of the sub-objects based on the weight.

6. The RFID system of claim 2, wherein the measuring assembly includes a depth camera configured to obtain a 3D information of the object, and the computing processor determines a volume of the object based on the 3D information.

7. The RFID system of claim 2, wherein the measuring assembly includes a camera configured to obtain an image of the object, the object is a plurality of sub-objects, and the computing processor of the measuring assembly determines an amount of the sub-objects based on the image.

8. The RFID system of claim 2, wherein the measuring assembly includes a spectrometer, the spectrometer emits a light to the object and detects a reflected light from the object to obtain a spectrum of the object, and the computing processor of the measuring assembly determines a material of the object based on the spectrum.

9. The RFID system of claim 2, wherein the measuring assembly includes a thermometer configured to sense a temperature of the object.

10. The RFID system of claim 1, wherein the transreceiver writes the first data received from the measuring assembly into the IC chip.

11. The RFID system of claim 1, wherein the radiation pattern has a coupling range and the transreceiver has a transmitting range, the transreceiver performs at least one of receiving the first data and sending the second data when the loop antenna is within the coupling range and the coupling range overlaps the transmitting range.

12. The RFID system of claim 11, wherein a radius of the coupling range is within 30 cm.

13. The RFID system of claim 1, wherein the radiation pattern is disposed on a supporting surface of a measuring apparatus of the measuring assembly, wherein the supporting surface is configured to support the object.

14. The RFID system of claim 1, wherein the transreceiver has a reader and a reader antenna, the reader antenna is arranged in a position out of a transmitting range of the loop antenna and within that of a combination of the loop antenna and the radiation pattern.

* * * * *